United States Patent
Lewallen

(10) Patent No.: US 10,056,583 B1
(45) Date of Patent: Aug. 21, 2018

(54) E-TEXTILE POWER MODULE

(71) Applicant: Intel Corporation, Santa Clara, CA (US)

(72) Inventor: Eric Lewallen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/479,800

(22) Filed: Apr. 5, 2017

(51) Int. Cl.
*H01M 2/10* (2006.01)

(52) U.S. Cl.
CPC ...... *H01M 2/1044* (2013.01); *H01M 2220/30* (2013.01)

(58) Field of Classification Search
CPC .................................................. H01M 2/1044
See application file for complete search history.

*Primary Examiner* — Olatunji Godo
(74) *Attorney, Agent, or Firm* — Schwegman Lundberg & Woessner, P.A.

(57) ABSTRACT

Devices and techniques for an e-textile power module are described. A battery housing and a battery housing seat are provided. The battery housing seat includes four concentric circles alternating between insulating and conducting materials, a first trace electrically connecting the first inner circle to e-textile wiring through the fabric, a second trace electrically connecting the third inner circle to the e-textile wiring through the fabric, and a magnet. The battery housing includes a conductive ring, an insulating layer with a lumen arranged to permit contact of a first battery terminal of a battery via the lumen and a second lumen of the conductive ring, and a conductive cap. The4 conductive cap is arranged to engage to the conductive ring to hold the battery against the insulating layer against the conductive ring and electrically connect to a second terminal of the battery when the battery is placed within the battery housing.

24 Claims, 7 Drawing Sheets

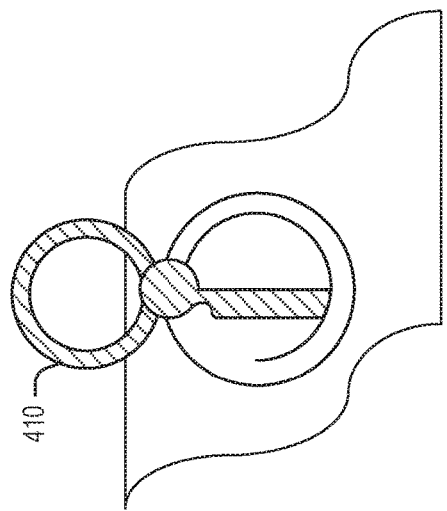
FIG. 4A
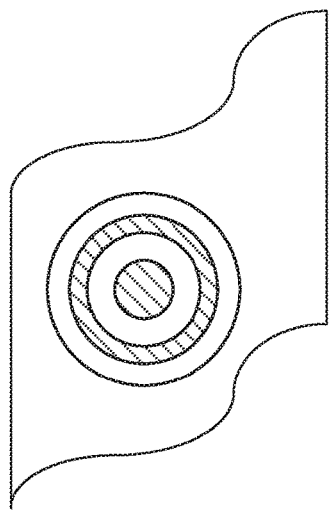
FIG. 4B
FIG. 4C
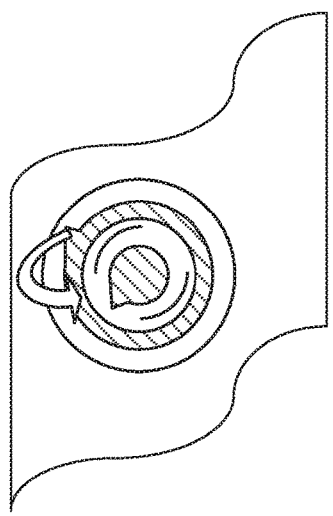
FIG. 4D

E-TEXTILE POWER MODULE

TECHNICAL FIELD

Embodiments described herein generally relate to battery power systems and more specifically to an e-textile power module.

BACKGROUND

The use of low power wearable sensors (e.g., apparel compute devices) has generated great interest in e-textiles (e.g., smart garments, fabric based sensing system, etc.) for sport and fitness that enable real-time processing of biometric data such as heart rate, respiration rate, body temperature, and motion that may be correlated to provide an indicator of an athlete's performance. Typically, these apparel compute devices include processing components (e.g., microprocessor, communications, storage, sensor, power, etc.), and a clothing integration component (e.g., isolated conductive features integrated into a garment, such as wires, intra garment communication, etc.).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 4A-4D illustrate a technique for assembling a battery housing base, according to an embodiment.

DETAILED DESCRIPTION

Current arrangements for apparel compute devices include integrating everything into a garment or integrating sensors directly into the garment with conductive traces leading to a removable computing device or hub. A removable hub may allow for ease in charging a battery, for example, as well as reducing manufacturing costs by, for example, not having to guard against a washing environment (e.g., the hub is removed prior to washing the garment). Hub connections in removable arrangements are typically achieved via two or more conductive snap connectors or a pocket sewn into the garment and a wired connection.

As wearable computing devices become smaller and more tightly integrated with garments, there is a need for an attachment method that holds the compute device securely without using connecting snaps prevalent in the industry because snaps tend to be large with respective to fabric surface area as well as "high" or "tall" holding the compute device away from the fabric surface. These problems with current fastening devices may be addressed via a magnetic coupling with a physical arrangement to enforce an orientation of the apparel compute device and the garment. Thus, the drawbacks of snaps are avoided while still maintaining the detachable nature of the apparel compute device as well as enforcing positional arrangements to improve performance of the apparel compute device when attached to the garment. Typically, however, power (e.g., a battery) is provided as part of the removable compute devices. When a battery is spent, generally, the entire compute device is serviced or replaced.

As new, lightweight electronic components with small profiles continue to be developed, permanent integration in garments will become more commonplace. A constant, however, is providing power to integrated components. Thus, what is needed is a power module for e-textiles that is serviceable by a user to replace or recharge the battery. In an example, a button cell battery (e.g., coin cell battery, watch battery, etc.) is housed in a conductive cap that directs power and ground directly to a magnetized seat. The seat comprises a set of concentric rings that alternate between insulating and conducting materials (e.g., fabrics) that may be adhered (e.g., is heat pressed) to an e-textile. A magnet (e.g., strong and thin) is bonded inside the garment opposite the seat, which magnetically holds the battery in place. This assembly enables electronics integration into very thin fabrics, such as spandex or other stretchable knit structures.

Figure 1A:
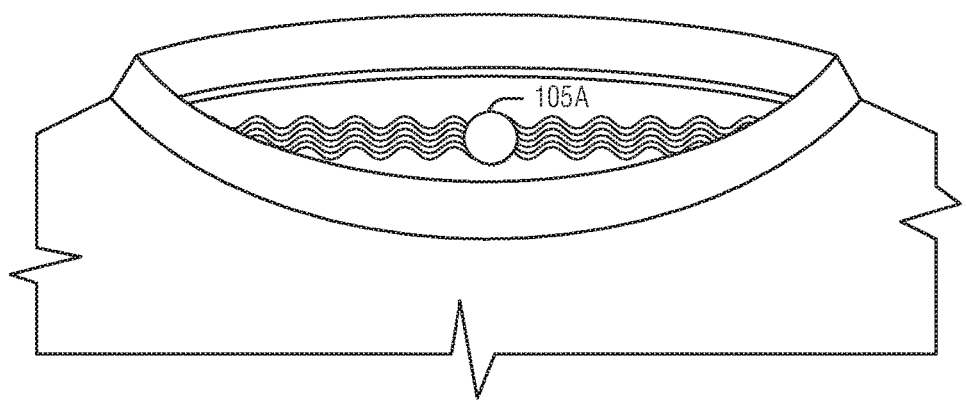
FIGS. 1A and 1B illustrate use of an e-textile power module with a shirt, according to an embodiment.
Figure 1B:
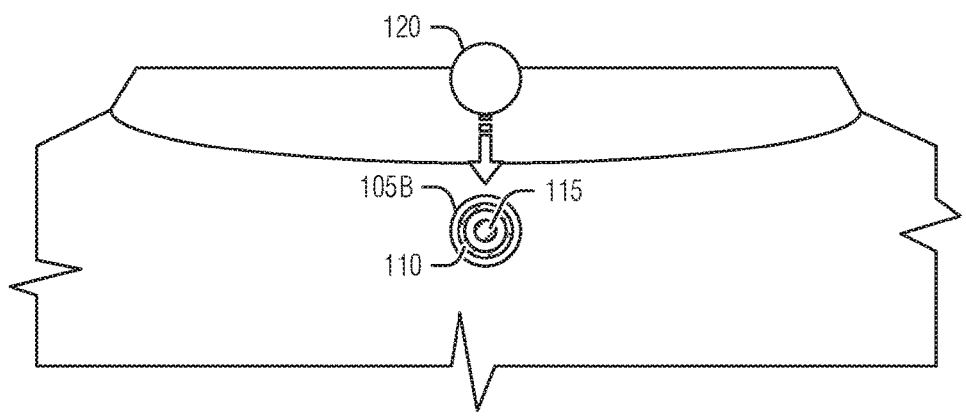

FIGS. 1A and 1B illustrate use of the e-textile power module with a shirt, according to an embodiment. FIG. 1A is a front view of the inside of a shirt. The seat 105A connects to e-textile traces. In an example, the seat 105A holds a magnet. The seat 105 passes traces through the fabric or fabrics of the shirt to the back, illustrated in FIG. 1B. The rear-view of the seat 105B includes concentric insulating and conducting rings. Here, the shaded rings 110 and 115 are the conductive rings. The magnetic battery housing 120 is held onto the seat 105B via a magnet and electrically connects a positive and negative pole of a battery within the housing to conductive inner circle 110 and conductive inner circle 115 respectively.

The e-textile power module includes three components. Second, the e-textile power module includes a battery housing with battery. Second, the e-textile power module includes a conductive fabric node seat 105 with electronic traces leading to the garment sensing system. Third, the e-textile power module includes a magnet, permanently or removeably, integrated into the garment to securely hold the battery. The battery housing includes positive and negative contacts exposed on a single side (e.g., on a side facing the seat 105 when attached) that align to the magnetic seat and supply power to the e-textile system.

The node seat 105 is permanently bonded to the fabric and provides a stable conductive base for connecting the battery to the e-textile system. As noted above, the node seat 105 comprise concentric rings that align to the power and ground of the battery housing when attached. The conductive fabric is permanently bonded to the garment with an adhesive. Materials such as metallized sealant films (e.g., Bemis EXOFLEX film) may be used for this purpose. The conductive pathways (e.g., traces) are passed through the garment fabric via slits or holes to enable connection to the internal sensing system. The magnet may be permanently bonded or sewn inside the garment directly behind the node seat 105. Additional details and examples are described below.

Figure 2:
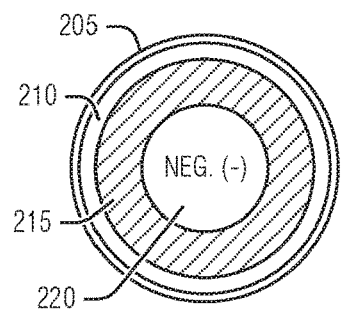
FIG. 2 illustrates a bottom view of an assembled battery base, according to an embodiment.

FIG. 2 illustrates a bottom view of an assembled battery base 205, according to an embodiment. From this perspective of the battery base 205 assembled and holding a button cell battery, the conductive ring 210 is on the outside, the insulating layer forms a second concentric circle and the negative pole 220 of the button battery is exposed via the lumen in the insulating layer. The conductive cap (not visible) contacts the positive pole of the button battery and is electrically connected to the conductive ring 210. Thus, the conductive ring 210 provides an electrical connection to the positive pole of the button battery while the button battery's negative pole 220 is exposed on the same side of the battery housing 205.

Figure 3:
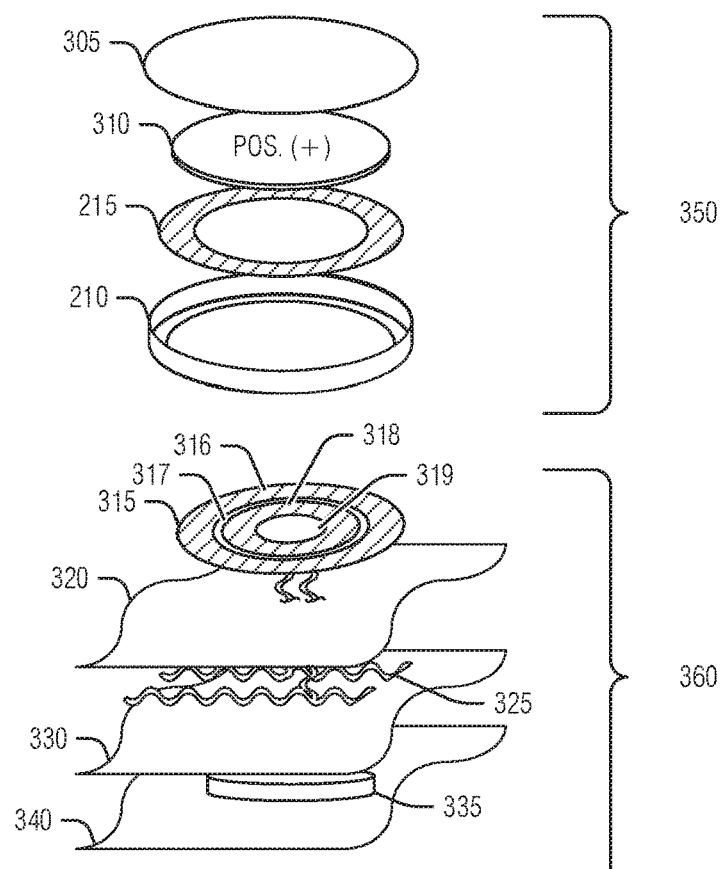
FIG. 3 illustrates an exploded assembly of an e-textile power module, according to an embodiment.

FIG. 3 illustrates an exploded assembly of an e-textile power module, according to an embodiment. The battery housing 305 includes a conductive ring 210, an insulating layer with a lumen 215 and a conductive cap 305. The insulating layer 215 is arranged to permit contact of a first battery terminal (e.g., the negative pole) of a battery 310 via the lumen and a second lumen of the conductive ring. Thus, the negative pole of the battery 310 is exposed through the insulating layer 215 and the conductive ring as illustrated in FIG. 2.

The conductive cap 305 is arranged to engage to the conductive ring 210 to hold the battery 310 against the insulating layer 215 against the conductive ring 210 as illustrated in FIG. 3. The conductive cap 305 is also arranged to electrically connect to the conductive ring and to electrically connect to a second terminal (e.g., the positive pole) of the battery 310 when the battery 310 is placed within the battery housing.

In an example, the conductive ring 210 is magnetic or includes a magnetic component. In an example, the conductive cap 305 is magnetic or includes a magnetic component. In an example, the battery housing 350 includes a magnetic component (not shown). In this example, the magnetic component does not impair electrical connections to the battery 310 of either the conductive ring 210 or the conductive cap 305.

As illustrated in FIG. 3 and described above, the conductive cap 305 and the conductive ring 210 are arranged to hold a button cell battery. Other example configuration may operate on other battery configurations however, by connecting—for example by wire or by conductive cap 305 and conductive ring 210 modification—the positive pole to the exterior conductive surfaces and the negative pole to a conductor in the bottom surface (the surface that interfaces with the seat 315).

In an example, the conductive ring 210 and conductive cap 305 are arranged to be repeatedly engaged. Example repeated engagement designs may include a fastener (e.g., clip, screw, magnetic, etc.) or a complimentary concave and convex feature on the two parts. In an example, the conductive ring 210 and the conductive cap 305 are bonded (e.g., with an adhesive, welded, braised, etc.).

The base 360 for the battery housing 350 includes a seat 315. The seat 315 includes an insulating outer circle 316 disposed on a first side of a fabric 320, a conductive first inner circle 317 placed within (e.g., radially inward and wholly enclosed by) the outer circle 316, an insulating second inner circle 318 placed within the first inner circle 317, and a conductive third inner circle 319 placed within the second inner circle 318. Although the term circle is used here, the outer circle 316, the first inner circle 317, and the second inner circle 318 may be other shapes that maintain electric isolation between the first inner circle 317 and the third inner circle 319.

The base 360 also includes a first trace electrically connecting the first inner circle 317 to e-textile wiring 325 through the fabric 320 and a second trace electrically connecting the third inner circle 319 to the e-textile wiring 325 through the fabric. The base 360 also includes a magnet 335 disposed on a second side of the fabric 320. As illustrated, the magnet 335 is held between a substrate 330 for the e-textile wiring 325 and a backing material 340. In an example, the magnet 335 is permanently bonded to the fabric 320. In an example, the permanent bond is created by an adhesive (e.g., glue, epoxy, etc.) bonding the magnet 335 directly to the fabric 320, or to a material otherwise bonded to the fabric 320. For example, the magnet 335 may be glued to the backing material 340 which is in turn bonded (e.g., via adhesive) or sewn to the e-textile wiring substrate 330 which is itself bonded to the fabric 320. In an example, the magnet 335 is disposed in a sealed fabric pocket to permanently bind it to the fabric.

In an example, the outer circle 316 includes an adhesive to bond to the first side of the fabric 320. In an example, the adhesive is activated via heat. In an example, the adhesive is activated by pressure. In an example, the adhesive is activated by heat and pressure.

In an example, the first trace is arranged to electrically connect to a positive pole of the battery 310. Thus, the first inner circle 317 is arranged to receive a positive pole of the battery 310 via the conductive ring 210. In an example, the second trace is arranged to electrically connect to a negative pole of the battery. Thus, the third inner circle 319 is arranged to receive the negative pole 220 of the battery 310 directly from the battery 310.

FIGS. 4A-4D illustrate a technique for assembling a battery housing base, according to an embodiment. FIG. 4A illustrates the outer circle 405 of the seat that is perforated. The outer circle 405 may be bonded to the underlying fabric via an adhesive or sewn to the underlying fabric. In FIG. 4B, the first inner circle 410 and the third inner circle are connected to respective traces and drawn through perforations in the outer circle 405. In FIG. 4C, the first inner circle 410 and third inner circle are folded over and onto the outer circle 405 and bonded to the outer circle 405 (e.g., heat pressed). In this example, after folding the first inner circle 405 and the third inner circle onto the outer circle 405, the outer circle material forms both the outer circle 405 and the second inner circle, providing electrical insulation between the first inner circle 405 and the third inner circle. FIG. 4D illustrates the completed seat with the concentric circles that alternate between insulating material and conductive material. Here, the conductive material is shaded.

Figure 5A:
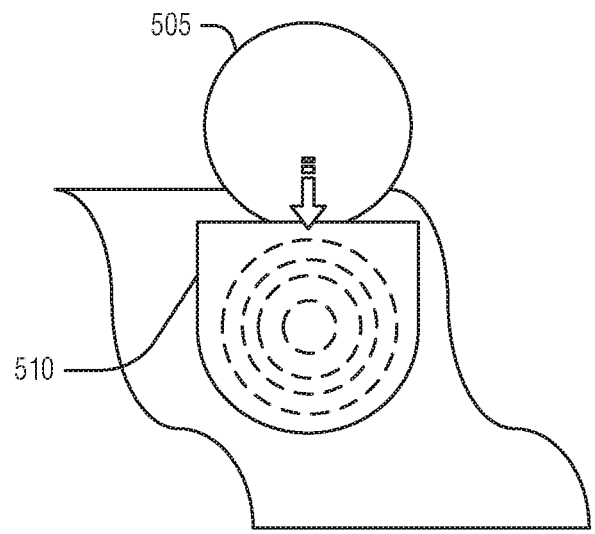
FIGS. 5A and 5B illustrate attaching a magnet to an e-textile, according to an embodiment.
Figure 5B:
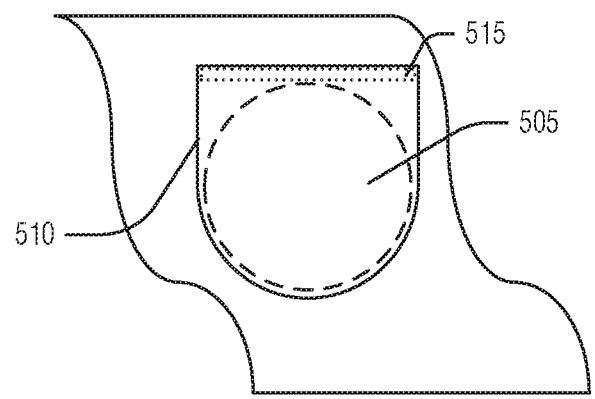

FIGS. 5A and 5B illustrate attaching a magnet to an e-textile, according to an embodiment. FIG. 5A illustrates the battery 505 being placed in a pocket 510 which is disposed opposite to the seat (illustrated as dashed lines). FIG. 5B illustrates the battery 505 secured within the pocket 510 which is sealed 515 via an adhesive, a weld, stitching, etc.

Figure 6:
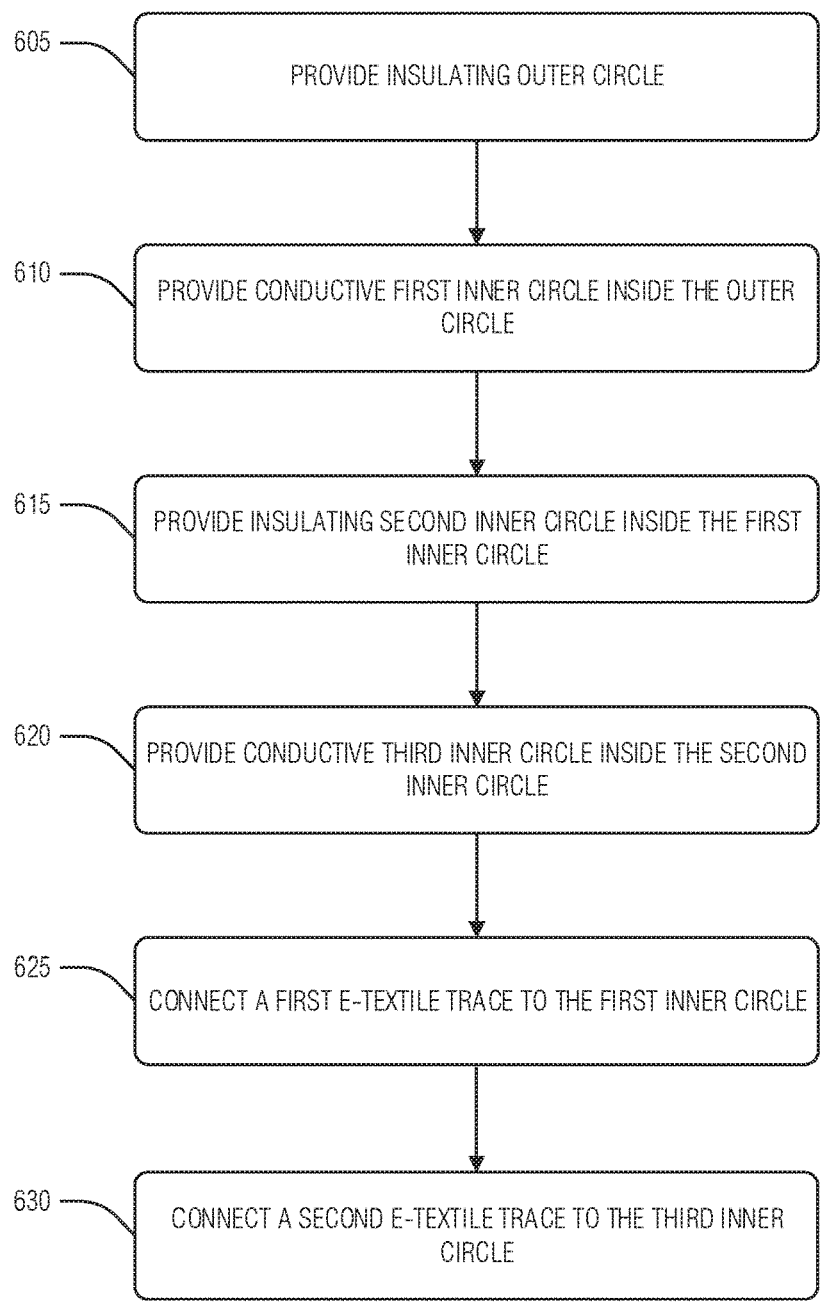
FIG. 6 illustrates an example of a method to implement a base for a battery housing in an e-textile power module, according to an embodiment.

FIG. 6 illustrates an example of a method 600 to implement a base for a battery housing in an e-textile power module, according to an embodiment.

At operation 605, an insulating outer circle is provided on a first side of a fabric. In an example, the outer circle is bound to the first side of the fabric with an adhesive. In an example, the adhesive is included in a material of the outer circle. In an example, the adhesive is activated via heat.

At operation 610, a conductive first circle is provided within the outer circle and bonded to the outer circle.

At operation 615, an insulating second inner circle is provided within the first inner circle. In an example, the first inner circle is a ring and the second inner circle is a part of the outer circle that is within the ring.

At operation 620, a conductive third inner circle is provided within the second inner circle.

At operation 625, a first trace electrically connecting the first inner circle to e-textile wiring through the fabric is provided. In an example, the first trace is arranged to electrically connect to a positive pole of a battery.

At operation 630, a second trace electrically connecting the third inner circle to e-textile wiring through the fabric is provided. In an example, the second trace is arranged to electrically connect to a negative pole of a battery.

The method 600 may be extended by providing a magnet disposed on a second side of the fabric. In an example, the magnet is bound to the fabric permanently. In an example, binding the magnet to the fabric includes placing magnet into pocket and sealing the pocket.

Figure 7:
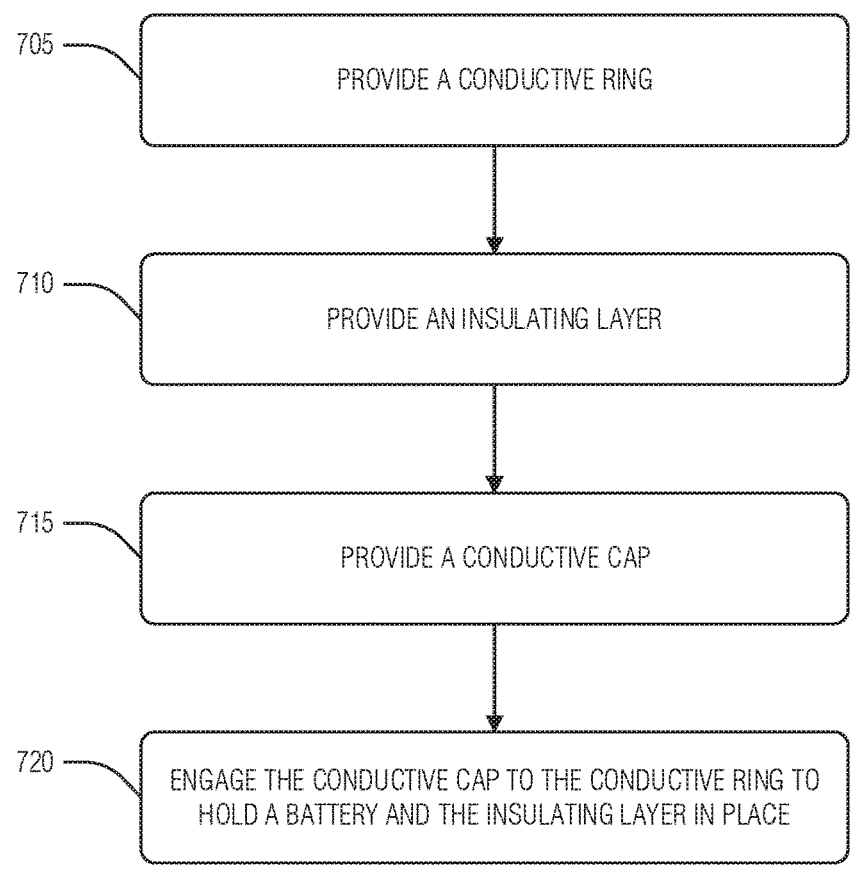
FIG. 7 illustrates an example of a method to implement a battery housing in an e-textile power module, according to an embodiment.

FIG. 7 illustrates an example of a method 700 to implement a battery housing in an e-textile power module, according to an embodiment.

At operation 705, a conductive ring is provided. In an example, the conductive ring is magnetic. In an example, the conductive ring has a magnetic element incorporate within it.

At operation 710, an insulating layer is provided. The insulating layer has a lumen (e.g., hole) arranged to permit contact of a first battery terminal of a battery via the lumen and a second lumen of the conductive ring (e.g., the hold which the ring encircles).

At operation 715, a conductive cap is provided. The conductive cap is arranged to engage the conductive ring to hold a battery against the insulating layer and the conductive ring. The conductive cap is also arranged to electrically connect a second terminal of the battery to the conductive ring when the battery is placed within the housing. In an example, the conductive cap is magnetic. In an example, the conductive cap has a magnetic element within it.

At operation 720, the conductive cap is engaged to the conductive ring to hold the battery in place, completing the removable portion of the e-textile power module.

The method 700 may be extended to include providing a magnetic component to the battery housing that does not impair electrical connections to the battery of either the conductive ring or the conductive cap. In an example, the magnetic component is held between the conductive cap and a lower portion of the conductive ring.

In an example, the conductive cap and the conductive ring are arranged to hold a button cell battery. In an example, the conductive cap is arranged to contact a positive pole of the button battery.

In an example, the conductive ring and conductive cap are arranged to be repeatedly engaged.

Figure 8:
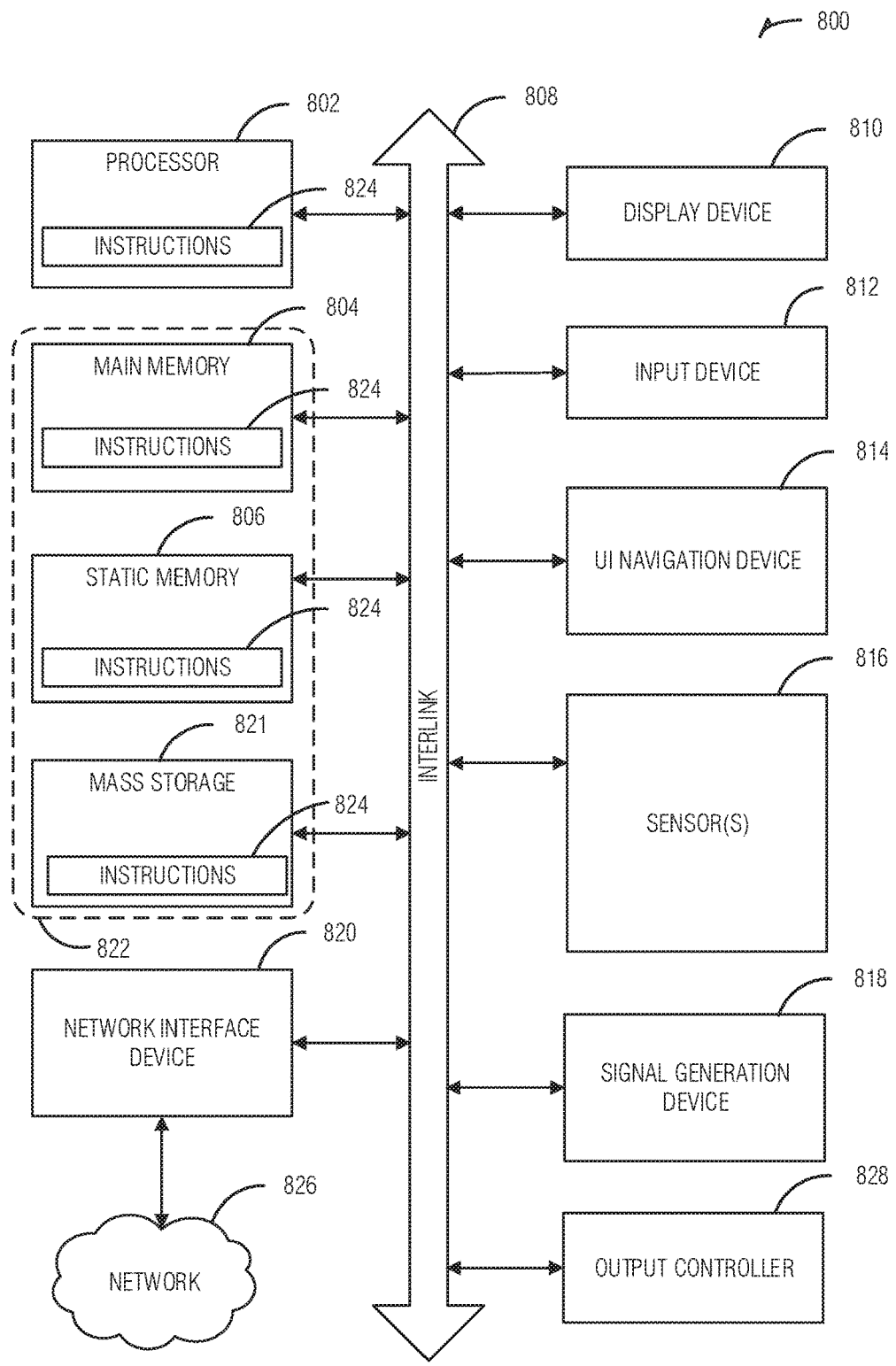
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. Examples, as described herein, may include, or may operate by, logic, components, or mechanisms in the machine 800. Circuitry (e.g., processing circuitry) is a collection of circuits implemented in tangible entities of the machine 800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 may include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 821 (e.g., hard drive, tape drive, flash storage, or other block devices) some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or another sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 816 may be, or include, a machine readable medium 822 on which is stored one or more sets of data structures or instructions 824 (e.g., software) embodying or utilized by any one or more of the techniques or functions described herein. The instructions 824 may also reside, completely or at least partially, within any of registers of the processor 802, the main memory 804, the static memory 806, or the mass storage 816 during execution thereof by the machine 800. In an example, one or any combination of the hardware processor 802, the main memory 804, the static memory 806, or the mass storage 816 may constitute the machine readable media 802. While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

Additional Notes & Examples

Example 1 is a battery housing for e-textile systems, the battery housing comprising: a conductive ring; an insulating layer with a lumen arranged to permit contact of a first battery terminal of a battery via the lumen and a second lumen of the conductive ring; and a conductive cap, the conductive cap arranged to: engage to the conductive ring to hold the battery against the insulating layer against the conductive ring; electrically connect to the conductive ring; and electrically connect to a second battery terminal of the battery when the battery is placed within the battery housing.

In Example 2, the subject matter of Example 1 optionally includes wherein at least one of the conductive ring or the conductive cap includes a magnetic component.

In Example 3, the subject matter of any one or more of Examples 1-2 optionally include a magnetic component that does not impair electrical connections to the battery of either the conductive ring or the conductive cap.

In Example 4, the subject matter of any one or more of Examples 1-3 optionally include wherein the conductive cap and the conductive ring are arranged to hold a button cell battery.

In Example 5, the subject matter of Example 4 optionally includes wherein the conductive cap is arranged to contact a positive pole of the button battery.

In Example 6, the subject matter of any one or more of Examples 1-5 optionally include wherein the conductive ring and conductive cap are arranged to be repeatedly engaged.

Example 7 is a base for a battery housing for e-textile systems, the base comprising: an insulating outer circle disposed on a first side of a fabric; a conductive first inner circle placed within the outer circle; an insulating second inner circle placed within the first inner circle; a conductive third inner circle placed within the second inner circle; a first trace electrically connecting the first inner circle to e-textile wiring through the fabric; a second trace electrically connecting the third inner circle to the e-textile wiring through the fabric; and a magnet disposed on a second side of the fabric opposite the first side of the fabric.

In Example 8, the subject matter of Example 7 optionally includes wherein the magnet is permanently bonded to the fabric.

In Example 9, the subject matter of Example 8 optionally includes wherein the magnet is permanently bonded to the fabric via a sealed pocket.

In Example 10, the subject matter of any one or more of Examples 7-9 optionally include wherein the outer circle includes an adhesive to bond to the first side of the fabric.

In Example 11, the subject matter of Example 10 optionally includes wherein the adhesive is activated via heat.

In Example 12, the subject matter of any one or more of Examples 7-11 optionally include wherein the first trace is arranged to electrically connect to a positive pole of a battery.

In Example 13, the subject matter of any one or more of Examples 7-12 optionally include wherein the second trace is arranged to electrically connect to a negative pole of a battery.

Example 14 is a method for a removable battery housing for e-textile systems, the method comprising: providing a battery housing seat, the battery housing seat comprising: an insulating outer circle disposed on a first side of a fabric; a conductive first inner circle placed within the outer circle; an insulating second inner circle placed within the first inner circle; a conductive third inner circle placed within the second inner circle; a first trace electrically connecting the first inner circle to e-textile wiring through the fabric; a second trace electrically connecting the third inner circle to the e-textile wiring through the fabric; and a magnet disposed on a second side of the fabric; and providing a battery housing, the battery housing comprising: a conductive ring; an insulating layer with a lumen arranged to permit contact of a first battery terminal of a battery via the lumen and a second lumen of the conductive ring; and a conductive cap, the conductive cap arranged to: engage to the conductive ring to hold the battery against the insulating layer against the conductive ring; electrically connect to the conductive ring; and electrically connect to a second terminal of the battery when the battery is placed within the battery housing.

In Example 15, the subject matter of Example 14 optionally includes binding the magnet to the fabric permanently.

In Example 16, the subject matter of Example 15 optionally includes wherein binding the magnet to the fabric includes: placing magnet into pocket; and sealing the pocket.

In Example 17, the subject matter of any one or more of Examples 14-16 optionally include binding the outer circle to the first side of the fabric with an adhesive.

In Example 18, the subject matter of Example 17 optionally includes wherein the adhesive is included in a material of the outer circle.

In Example 19, the subject matter of Example 18 optionally includes wherein the adhesive is activated via heat.

In Example 20, the subject matter of any one or more of Examples 14-19 optionally include wherein the first trace is arranged to electrically connect to a positive pole of a battery.

In Example 21, the subject matter of any one or more of Examples 14-20 optionally include wherein the second trace is arranged to electrically connect to a negative pole of a battery.

In Example 22, the subject matter of any one or more of Examples 14-21 optionally include wherein at least one of the conductive ring or the conductive cap includes a magnetic component.

In Example 23, the subject matter of any one or more of Examples 14-22 optionally include providing a magnetic component to the battery housing that does not impair electrical connections to the battery of either the conductive ring or the conductive cap.

In Example 24, the subject matter of any one or more of Examples 14-23 optionally include wherein the conductive cap and the conductive ring are arranged to hold a button cell battery.

In Example 25, the subject matter of Example 24 optionally includes wherein the conductive cap is arranged to contact a positive pole of the button battery.

In Example 26, the subject matter of any one or more of Examples 14-25 optionally include wherein the conductive ring and conductive cap are arranged to be repeatedly engaged.

Example 27 is a system comprising means to perform any method of Examples 14-26.

Example 28 is at least one machine readable medium including instructions that, when executed by a machine, cause a machine to perform any method of Examples 14-26.

Example 29 is a system for a removable battery housing for e-textile systems, the system comprising: means for providing a battery housing seat, the battery housing seat comprising: an insulating outer circle disposed on a first side of a fabric; a conductive first inner circle placed within the outer circle; an insulating second inner circle placed within the first inner circle; a conductive third inner circle placed within the second inner circle; a first trace electrically connecting the first inner circle to e-textile wiring through the fabric; a second trace electrically connecting the third inner circle to the e-textile wiring through the fabric; and a magnet disposed on a second side of the fabric; and means for providing a battery housing, the battery housing comprising: a conductive ring; an insulating layer with a lumen arranged to permit contact of a first battery terminal of a battery via the lumen and a second lumen of the conductive ring; and a conductive cap, the conductive cap arranged to: engage to the conductive ring to hold the battery against the insulating layer against the conductive ring; electrically connect to the conductive ring; and electrically connect to a second terminal of the battery when the battery is placed within the battery housing.

In Example 30, the subject matter of Example 29 optionally includes means for binding the magnet to the fabric permanently.

In Example 31, the subject matter of Example 30 optionally includes wherein the means for binding the magnet to the fabric include: means for placing magnet into pocket; and means for sealing the pocket.

In Example 32, the subject matter of any one or more of Examples 29-31 optionally include means for binding the outer circle to the first side of the fabric with an adhesive.

In Example 33, the subject matter of Example 32 optionally includes wherein the adhesive is included in a material of the outer circle.

In Example 34, the subject matter of Example 33 optionally includes wherein the adhesive is activated via heat.

In Example 35, the subject matter of any one or more of Examples 29-34 optionally include wherein the first trace is arranged to electrically connect to a positive pole of a battery.

In Example 36, the subject matter of any one or more of Examples 29-35 optionally include wherein the second trace is arranged to electrically connect to a negative pole of a battery.

In Example 37, the subject matter of any one or more of Examples 29-36 optionally include wherein at least one of the conductive ring or the conductive cap includes a magnetic component.

In Example 38, the subject matter of any one or more of Examples 29-37 optionally include means for providing a magnetic component to the battery housing that does not impair electrical connections to the battery of either the conductive ring or the conductive cap.

In Example 39, the subject matter of any one or more of Examples 29-38 optionally include wherein the conductive cap and the conductive ring are arranged to hold a button cell battery.

In Example 40, the subject matter of Example 39 optionally includes wherein the conductive cap is arranged to contact a positive pole of the button battery.

In Example 41, the subject matter of any one or more of Examples 29-40 optionally include wherein the conductive ring and conductive cap are arranged to be repeatedly engaged.

Example 42 is at least one machine-readable medium including instructions, which when executed by a machine, cause the machine to perform operations of any of the operations of Examples 1-41.

Example 43 is an apparatus comprising means for performing any of the operations of Examples 1-41.

Example 44 is a system to perform the operations of any of the Examples 1-41.

Example 45 is a method to perform the operations of any of the Examples 1-41.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A battery housing for e-textile systems, the battery housing comprising:
   a conductive ring;
   an insulating layer with a lumen arranged to permit contact of a first battery terminal of a battery via the lumen and a second lumen of the conductive ring; and
   a conductive cap, the conductive cap arranged to:
      engage to the conductive ring to hold the battery against the insulating layer against the conductive ring;
      electrically connect to the conductive ring; and
      electrically connect to a second battery terminal of the battery when the battery is placed within the battery housing.

2. The battery housing of claim 1, wherein at least one of the conductive ring or the conductive cap includes a magnetic component.

3. The battery housing of claim 1, further comprising a magnetic component that does not impair electrical connections to the battery of either the conductive ring or the conductive cap.

4. The battery housing of claim 1 wherein the conductive cap and the conductive ring are arranged to hold a button cell battery.

5. The battery housing of claim 4, wherein the conductive cap is arranged to contact a positive pole of the button battery.

6. The battery housing of claim 1, wherein the conductive ring and conductive cap are arranged to be repeatedly engaged.

7. A base for a battery housing for e-textile systems, the base comprising:
   an insulating outer circle disposed on a first side of a fabric;
   a conductive first inner circle placed within the outer circle;
   an insulating second inner circle placed within the first inner circle;
   a conductive third inner circle placed within the second inner circle;
   a first trace electrically connecting the first inner circle to e-textile wiring through the fabric;
   a second trace electrically connecting the third inner circle to the e-textile wiring through the fabric; and
   a magnet disposed on a second side of the fabric opposite the first side of the fabric.

8. The base of claim 7, wherein the magnet is permanently bonded to the fabric.

9. The base of claim 8, wherein the magnet is permanently bonded to the fabric via a sealed pocket.

10. The base of claim 7, wherein the outer circle includes an adhesive to bond to the first side of the fabric.

11. The base of claim 10, wherein the adhesive is activated via heat.

12. The base of claim 7, wherein the first trace is arranged to electrically connect to a positive pole of a battery.

13. The base of claim 7, wherein the second trace is arranged to electrically connect to a negative pole of a battery.

14. A method for a removable battery housing for e-textile systems, the method comprising:
provinding a battery housing seat, the battery housing seat comprising:
an insulating outer circle disposed on a first side of a fabric;
a conductive first inner circle placed within the outer circle;
an insulating second inner circle placed within the first inner circle;
a conductive third inner circle placed within the second inner circle;
a first trace electrically connecting the first inner circle to e-textile wiring through the fabric;
a second trace electrically connecting the third inner circle to the e-textile wiring through the fabric; and
a magnet disposed on a second side of the fabric; and
providing a battery housing, the battery housing comprising:
a conductive ring;
an insulating layer with a lumen arranged to permit contact of a first battery terminal of a battery via the lumen and a second lumen of the conductive ring; and
a conductive cap, the conductive cap arranged to:
engage to the conductive ring to hold the battery against the insulating layer against the conductive ring:
electrically connect to the conductive ring; and
electrically connect to a second terminal of the battery when the battery is placed within the battery housing.

15. The method of claim 14, comprising binding the magnet to the fabric permanently.

16. The method of claim 15, wherein binding the magnet to the fabric includes:
placing magnet into pocket; and
sealing the pocket.

17. The method of claim 14, comprising binding the outer circle to the first side of the fabric with an adhesive.

18. The method of claim 17, wherein the adhesive is included in a material of the outer circle.

19. The method of claim 18, wherein the adhesive is activated via heat.

20. The method of claim 14, wherein the first trace is arranged to electrically connect to a positive pole of a battery.

21. The method of claim 14, wherein the second trace is arranged to electrically connect to a negative pole of a battery.

22. The method of claim 14 wherein the conductive cap and the conductive ring are arranged to hold a button cell battery.

23. The method of claim 22, wherein the conductive cap is arranged to contact a positive pole of the button battery.

24. The method of claim 14, wherein the conductive ring and conductive cap are arranged to be repeatedly engaged.

* * * * *

UNITED STATES PATENT AND TRADEMARK OFFICE
CERTIFICATE OF CORRECTION

PATENT NO. : 10,056,583 B1
APPLICATION NO. : 15/479800
DATED : August 21, 2018
INVENTOR(S) : Eric Lewallen Page 1 of 1

It is certified that error appears in the above-identified patent and that said Letters Patent is hereby corrected as shown below:

In the Claims

In Column 13, Line 31, in Claim 14, delete "ring:" and insert --ring;-- therefor Signed and Sealed this
Twenty-fifth Day of June, 2019

Andrei Iancu
*Director of the United States Patent and Trademark Office*